(12) United States Patent
Wang et al.

(10) Patent No.: US 10,642,483 B2
(45) Date of Patent: May 5, 2020

(54) QUICK SCREEN SPLITTING METHOD, APPARATUS, AND ELECTRONIC DEVICE, DISPLAY UI, AND STORAGE MEDIUM

(71) Applicant: HUAWEI TECHNOLOGIES CO., LTD., Shenzhen, Guangdong (CN)

(72) Inventors: Jin Wang, Shanghai (CN); Jie Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 141 days.

(21) Appl. No.: 15/779,039

(22) PCT Filed: Nov. 25, 2015

(86) PCT No.: PCT/CN2015/095564
§ 371 (c)(1),
(2) Date: May 24, 2018

(87) PCT Pub. No.: WO2017/088131
PCT Pub. Date: Jun. 1, 2017

(65) Prior Publication Data
US 2018/0356972 A1    Dec. 13, 2018

(51) Int. Cl.
*G06F 3/0488*    (2013.01)
*G06F 3/044*    (2006.01)
*G06F 3/0484*    (2013.01)

(52) U.S. Cl.
CPC .......... *G06F 3/04883* (2013.01); *G06F 3/044* (2013.01); *G06F 3/04845* (2013.01); *G06F 2203/04803* (2013.01)

(58) Field of Classification Search
CPC ........... G06F 2203/04803; G06F 3/044; G06F 3/04845; G06F 3/04883
See application file for complete search history.

(56) References Cited

U.S. PATENT DOCUMENTS

| 9,128,606 B2 | 9/2015 | Won et al. |
| 2008/0109740 A1 | 5/2008 | Prinsen et al. |

(Continued)

FOREIGN PATENT DOCUMENTS

| CN | 102365617 A | 2/2012 |
| CN | 101212752 B | 2/2013 |

(Continued)

OTHER PUBLICATIONS

International Search Report issued in International Application No. PCT/CN2015/095564 dated Aug. 17, 2016, 17 pages.

(Continued)

*Primary Examiner* — Dmitriy Bolotin
(74) *Attorney, Agent, or Firm* — Fish & Richardson P.C.

(57) ABSTRACT

Embodiments of the present invention disclose a quick screen splitting method, apparatus, and electronic device, a display user interface (UI), and a storage medium, and relate to the electronic field. The method includes: detecting, by a portable electronic device, a knuckle touch gesture acting on a touch-sensitive surface of the portable electronic device, and splitting, by the portable electronic device, a UI into at least two display areas in response to the knuckle touch gesture. The knuckle touch gesture includes a knuckle touch action that occurs when a touch-sensitive surface grid capacitance generated by the knuckle touch action acting on the touch-sensitive surface is within a first preset capacitance range, a quantity of non-zero capacitance grids is less than a preset value, and a Z-axis direction acceleration signal is within the first preset acceleration range.

20 Claims, 10 Drawing Sheets

(56) References Cited

U.S. PATENT DOCUMENTS

| | | |
|---|---|---|
| 2008/0158189 A1 | 7/2008 | Kim |
| 2008/0168403 A1* | 7/2008 | Westerman ......... G06F 3/04883 715/863 |
| 2010/0248788 A1 | 9/2010 | Yook et al. |
| 2012/0240042 A1* | 9/2012 | Migos .................... G06F 3/017 715/702 |
| 2012/0304084 A1 | 11/2012 | Kim et al. |
| 2013/0332881 A1 | 12/2013 | Yook et al. |
| 2014/0195953 A1 | 7/2014 | Sakai et al. |
| 2014/0267100 A1 | 9/2014 | Sohn et al. |
| 2014/0327626 A1 | 11/2014 | Harrison et al. |
| 2014/0351748 A1 | 11/2014 | Xia et al. |
| 2015/0035759 A1 | 2/2015 | Harrison et al. |
| 2016/0224145 A1* | 8/2016 | Harrison ................. G06F 3/043 |
| 2017/0344253 A1 | 11/2017 | Zhang |
| 2018/0081461 A1 | 3/2018 | Funahashi et al. |

FOREIGN PATENT DOCUMENTS

| | | |
|---|---|---|
| CN | 103067569 A | 4/2013 |
| CN | 103324435 A | 9/2013 |
| CN | 103425453 A | 12/2013 |
| CN | 103475784 A | 12/2013 |
| CN | 104035704 A | 9/2014 |
| CN | 104049728 A | 9/2014 |
| CN | 104331246 A | 2/2015 |
| CN | 104898952 A | 9/2015 |
| CN | 104965702 A | 10/2015 |
| EP | 2778866 A1 | 9/2014 |
| GB | 2523132 A | 8/2015 |
| JP | 2013137613 A | 7/2013 |
| JP | 2014132427 A | 7/2014 |
| JP | 2015520465 A | 7/2015 |
| RU | 2013152173 A | 5/2015 |

OTHER PUBLICATIONS

Extended European Search Report issued in European Application No. 15909043.0 dated Oct. 5, 2018, 9 pages.
Office Action issued in Japanese Application No. 2018-526897 dated Jun. 24, 2019, 7 pages (with English translation).
Chinese Office Action issued in Chinese Application No. 201580059602.7 dated Apr. 9, 2019, 9 pages.
Russian Office Action issued in Russian Application No. 2018122637 dated Apr. 10, 2019, 27 pages.
Examination Report issued in Australian Application No. 2015415755 dated Feb. 12, 2020, 4 pages.

* cited by examiner

QUICK SCREEN SPLITTING METHOD, APPARATUS, AND ELECTRONIC DEVICE, DISPLAY UI, AND STORAGE MEDIUM

CROSS-REFERENCE TO RELATED APPLICATIONS

This application is a National Stage of International Application No. PCT/CN2015/095564, filed on Nov. 25, 2015, which is hereby incorporated by reference in its entirety.

TECHNICAL FIELD

Embodiments of the present invention relate to a quick screen splitting method, apparatus, and electronic device, a display UI, and a storage medium, and in particular, to a method for splitting a display UI of a display having a touch-sensitive surface into at least two display areas by using a touch gesture.

BACKGROUND

In recent years, with rapid development of communications technologies and the electronic industry, a new service that is based on data, voice, and video rapidly develops. Rapid development of a microelectronic technology and a computer software and hardware technology enables a terminal to have more powerful functions. A user has an urgent requirement for a terminal device, and requires more powerful, more flexible, and more convenient functions of the terminal device, so as to provide more convenient user experience for the user.

The terminal device has gradually become an indispensable article in people's daily life. To make it more convenient for people to use the terminal device and provide better visual experience for people, a size of a screen of the terminal device is continuously increased. With development of a large-screen touch terminal device that can support various applications, it becomes more urgently required that the terminal device can simultaneously process multiple tasks.

However, to pursue better user experience, when requiring that the terminal device supports simultaneously processing the multiple tasks, the user further requires that display areas of multiple application programs are simultaneously presented on a same display UI. When an existing terminal device starts a screen splitting application, a screen splitting operation is performed with a need of triggering coordination between a screen splitting key or a virtual switch and a touch gesture, and a size and a quantity of windows of a split screen area after screen splitting are fixed. Therefore, based on a current urgent requirement of the user for simultaneously presenting the display areas of the multiple application programs on the same display UI, and a disadvantage in complex steps of the current screen splitting operation, it is necessary to put forward corresponding technical solutions so as to flexibly split the display UI of the terminal device and make it convenient to run a new application program and simultaneously execute the multiple tasks.

SUMMARY

To improve user experience in a screen splitting operation in the prior art, embodiments of the present invention provide a technical solution for quick screen splitting.

The foregoing objective and another objective are achieved according to characteristics in the independent claims. A further implementation is embodied in the dependent claims, the specification, and the accompanying drawings.

According to a first aspect, a quick screen splitting method is provided, and applied to a portable electronic device, where the electronic device includes a display having a touch-sensitive surface, and the method includes: when detecting a knuckle touch gesture acting on the touch-sensitive surface, splitting a display UI of the display into at least two display areas in response to the knuckle touch gesture. By presetting the knuckle touch gesture for triggering screen splitting, a screen splitting operation is performed when the knuckle touch gesture acting on the touch-sensitive surface is detected. The screen splitting operation can be simply and quickly implemented by using a gesture. A screen splitting operation process in the prior art is optimized, operation steps of screen splitting are simplified, and user experience is improved.

According to the first aspect, in a first possible implementation of the quick screen splitting, the knuckle touch gesture includes a knuckle touch action; and when a touch-sensitive surface grid capacitance generated by a touch action acting on the touch-sensitive surface is within a first preset capacitance range, a quantity of non-zero capacitance grids is less than a preset value, and a Z-axis direction acceleration signal is within a first preset acceleration range, the touch action is the knuckle touch action, and a gesture that includes the knuckle touch action is the knuckle touch gesture. Because a definition of a finger touch gesture on an electronic device is relatively common, a quick screen splitting function is implemented by using the knuckle touch gesture, and a new gesture is developed; in addition, because a determining condition of the knuckle touch gesture is different from a determining condition of a finger touch gesture, it is not prone to entering a split screen UI due to misoperation. Therefore, the screen splitting operation is more convenient, and user experience is improved.

According to an implementation of the first aspect, in a second possible implementation of the quick screen splitting, after the knuckle touch gesture acting on the touch-sensitive surface is detected, it is determined whether a movement distance of the knuckle touch gesture is greater than a preset distance threshold. By limiting a movement distance of a touch gesture for triggering the screen splitting operation, a probability of triggering the screen splitting operation due to misoperation is decreased, and user experience is improved.

According to the implementation of the first aspect, in a third possible implementation of the quick screen splitting, after the knuckle touch gesture acting on the touch-sensitive surface is detected, it is determined whether a track of the knuckle touch gesture matches a preset track. By limiting a track of the touch gesture for triggering the screen splitting operation, a probability of triggering the screen splitting operation due to misoperation is decreased, and user experience is improved.

According to the implementation of the first aspect, in a fourth possible implementation of the quick screen splitting, after the knuckle touch gesture acting on the touch-sensitive surface is detected, it is determined whether an angle of an included angle between a track of the knuckle touch gesture and a horizontal axis direction or a vertical axis direction is less than a preset angle.

According to the implementation of the first aspect, in a fifth possible implementation of the quick screen splitting, the splitting a display UI of the display into at least two display areas includes: splitting the display UI of the display into the at least two display areas according to a preset boundary. According to a location of the preset boundary, a location of a boundary may be preset in a relatively proper location with reference to a size of the display.

According to the implementation of the first aspect, in a sixth possible implementation of the quick screen splitting, the splitting a display UI of the display into at least two display areas includes: splitting the display UI of the display into the at least two display areas according to a track of the knuckle touch gesture. By using the track of the touch gesture as the boundary, the location of the boundary and a shape of the boundary may be flexibly adjusted according to the track of the touch gesture of a user, thereby providing more flexible and more diverse split screen display UIs.

According to the implementation of the first aspect, in a seventh possible implementation of the quick screen splitting, the splitting a display UI of the display into at least two display areas includes: splitting the display UI of the display into the at least two display areas according to a direction of the knuckle touch gesture and coordinates of a start location of the knuckle touch gesture. The location of the boundary is related to the coordinates of the start location of the touch gesture. Therefore, the user can purposefully adjust the start location of the touch gesture according to a running UI of an application program displayed before the screen splitting, and the user can determine the location of the boundary by adjusting the start location of the touch gesture and the direction of the touch gesture, so as to adjust locations and/or sizes of the at least two display areas according to the start location and the direction that are of the touch gesture. In this way, user experience in a screen splitting operation is improved.

According to the first aspect or any possible implementation of the first aspect, in an eighth possible implementation of the quick screen splitting, the splitting a display UI of the display into at least two display areas includes: when a running UI of a first application program is displayed on the display UI of the display, reducing a size of the running UI of the first application program, displaying, in a first display area, a reduced running UI of the first application program, generating, in a display area except the first display area, at least one display area, and displaying, in the generated display area, an identifier of one or more application programs related to the first application program; or when a running UI of a first application program is displayed on the display UI of the display, reducing a size of the running UI of the first application program, displaying, in a first display area, a reduced running UI of the first application program, generating, in a display area except the first display area, at least one display area, and displaying, in the generated display area, a running UI of an application program related to the first application program; or when a running UI of a first application program is displayed on the display UI of the display, reducing a size of the running UI of the first application program, displaying, in a first display area, a reduced running UI of the first application program, generating, in a display area except the first display area, at least one display area, and displaying, in the generated display area, a main menu UI; or when a running UI of a first application program is displayed on the display UI of the display, reducing a size of the running UI of the first application program, displaying, in a first display area, a reduced running UI of the first application program, generating, in a display area except the first display area, at least one display area, and displaying, in the generated display area, a historical program identifier; or when a running UI of a first application program is displayed on the display UI of the display, reducing a size of the running UI of the first application program, displaying, in a first display area, a reduced running UI of the first application program, generating, in a display area except the first display area, at least one display area, and displaying, in the generated display area, a thumbnail of a running UI of a historical program. The running UI of the first application program is displayed in a display area of the display UI after the screen splitting, and content displayed in a display area except the running UI of the first application program after the screen splitting improves convenience of a user operation. In this way, user experience is improved.

According to the first aspect, in a ninth possible implementation of the quick screen splitting, when an operation instruction of moving an identifier displayed in the display area except the first display area to the first display area is detected, a running UI of an application program corresponding to the identifier is displayed in the first display area; or when an operation instruction of moving an identifier displayed in the display area except the first display area to the first display area is detected, the identifier is displayed in the first display area; or when an operation instruction of moving an identifier displayed in the display area except the first display area to the first display area is detected, the identifier is embedded into the reduced running UI of the first application program; or when an operation instruction of moving content displayed in the display area except the first display area to the first display area is detected, the moved content is embedded into the reduced running UI of the first application program. An interactive operation between display areas after the screen splitting makes an electronic device operation more convenient, and user experience is improved.

In a possible design, the gesture for triggering the screen splitting operation may be further a pressure touch gesture. The pressure touch gesture brings people with 3D tactile experience and becomes more popular among people; in addition, compared with finger touch, the pressure touch gesture is not prone to being triggered by mistake. Operation steps of screen splitting are simplified, and operation experience in the screen splitting is improved.

In a possible design, when it is determined that the touch gesture matches the preset gesture, it is determined whether a start location of the touch gesture is close to a predetermined area of a first edge of the touch-sensitive display unit, and/or whether an end location of the touch gesture is beyond the touch-sensitive display unit or is close to a predetermined area of a second edge of the touch-sensitive display unit. By limiting a determining condition for triggering the screen splitting operation, a probability of triggering the screen splitting operation due to misoperation is decreased, and user experience is improved.

In a possible design, after the display UI of the display is split into the at least two display areas, the sizes and/or the locations of the at least two display areas are adjusted by adjusting the location of the boundary between the at least two display areas. It is convenient for a user to adjust the size and/or the location of the display area after the screen splitting, and it is convenient for the user to adaptively adjust the size and/or the location of each display area according to display content of a display UI of each display area. In this way, user experience is improved.

In a possible design, after the display UI of the display is split into the at least two display areas, when a touch gesture acting on the at least two display areas is detected, and a track of the touch gesture matches a preset graph track, locations or display content of the at least two display areas are interchanged. It is convenient for the user to adjust, by using the touch gesture, the display area to a display area that is easy to be controlled. Especially for an electronic device whose display size is relatively large, not all display areas of the display are easy to be touched and controlled. In this way, user experience is improved.

In a possible design, after the display UI of the display is split into the at least two display areas, when a gesture for quitting the split screen is detected, the at least two display areas are combined into one display area. The at least two display areas after the screen splitting can be conveniently and quickly combined into one display area by using a gesture operation, an operation for quitting the split screen is convenient and quick, and user experience is improved.

According to a second aspect, a portable electronic device for quick screen splitting is provided, where the electronic device has a corresponding function for implementing the foregoing method. The function may be implemented by hardware, or may be implemented by hardware by executing corresponding software. The hardware or the software includes one or more modules corresponding to the foregoing function. The portable electronic device includes a display, a memory, an acceleration sensor, and a processor; the display has a touch-sensitive surface; the touch-sensitive surface is used to receive a touch gesture; the display is further configured to display a UI; the memory is configured to store an instruction; the acceleration sensor is configured to obtain a Z-axis direction acceleration signal and transfer the obtained acceleration signal to the processor; and the processor invokes the instruction stored in the memory to implement the solution in the method design of the first aspect, and no repeated description is provided.

According to a third aspect, a quick screen splitting apparatus is provided, where the apparatus includes: a detection unit, configured to detect a touch gesture acting on a touch-sensitive surface; a determining unit, configured to determine whether the touch gesture matches a preset gesture; and a screen splitting unit, configured to split a display UI of a display into at least two display areas when the touch gesture matches the preset gesture. Based on a same inventive concept, a problem-resolving principle of the apparatus is corresponding to the solution in the method design of the first aspect. Therefore, for implementation of the apparatus, refer to implementation of the method, and no repeated description is provided.

According to a fourth aspect, a display UI of a portable electronic device is provided, where the portable electronic device includes a display, a memory, an acceleration sensor, and a processor that is configured to execute an instruction stored in the memory; the display has a touch-sensitive surface; when a touch gesture acting on the touch-sensitive surface is detected, it is determined whether the touch gesture matches a preset gesture; when it is determined that the touch gesture matches the preset gesture, a display UI of the display is split into at least two display areas in response to the touch gesture; when the processor executes the instruction stored in the memory, the solution in the method design of the first aspect is implemented; and a display UI generated when the processor executes the solution is displayed on the display UI of the portable electronic device.

According to a fifth aspect, a non-volatile computer readable storage medium for storing one or more programs is provided, where the one or more programs include an instruction, and when the instruction is executed by a portable electronic device that includes a display having a touch-sensitive surface, the instruction enables the portable electronic device to execute the solution in the method design of the first aspect, and no repeated description is provided.

The embodiments of the present invention disclose a technical solution for splitting a display UI of a display into at least two display areas by using a knuckle touch gesture. When a user wants to perform a screen splitting operation in a process of using an electronic device with a touch-sensitive display unit, a screen splitting function can be triggered only by executing the knuckle touch gesture on the touch-sensitive display unit. Correspondingly, the electronic device may split a display UI of the electronic device into at least two display areas according to the detected knuckle touch gesture. Compared with that in the prior art, in the present invention, the user can more conveniently implement the screen splitting function by using the knuckle touch gesture, and different display UIs can be separately presented in a provided split screen area. Therefore, according to the technical solution of the screen splitting operation provided in the present invention, an operation process of screen splitting in the prior art is optimized, operation steps of the screen splitting are simplified, and user experience is improved.

BRIEF DESCRIPTION OF DRAWINGS

To more clearly describe the technical solutions in the embodiments of the present invention, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

For ease of description, a portable electronic device 100 with a touch-sensitive display unit is used as an example for description in the embodiments of the present invention. It may be understood by persons skilled in the art that the embodiments of the present invention are also applicable to another apparatus, such as a handheld device, an in-vehicle device, a wearable device, a computing device, user equipment (User Equipment, UE), a mobile station (Mobile station, MS), a terminal (terminal), or a terminal device (Terminal Equipment) of various forms.

The electronic device 100 can support multiple applications, such as a multi-media application of video, audio, or the like, a text application (an email application, a blog application, a web browsing application, or the like), web browsing, or an instant messaging application. The touch-sensitive display unit of the electronic device 100 can intuitively present a display UI of the application. A user can execute various applications by using the touch-sensitive display unit of the electronic device 100.

Figure 1:
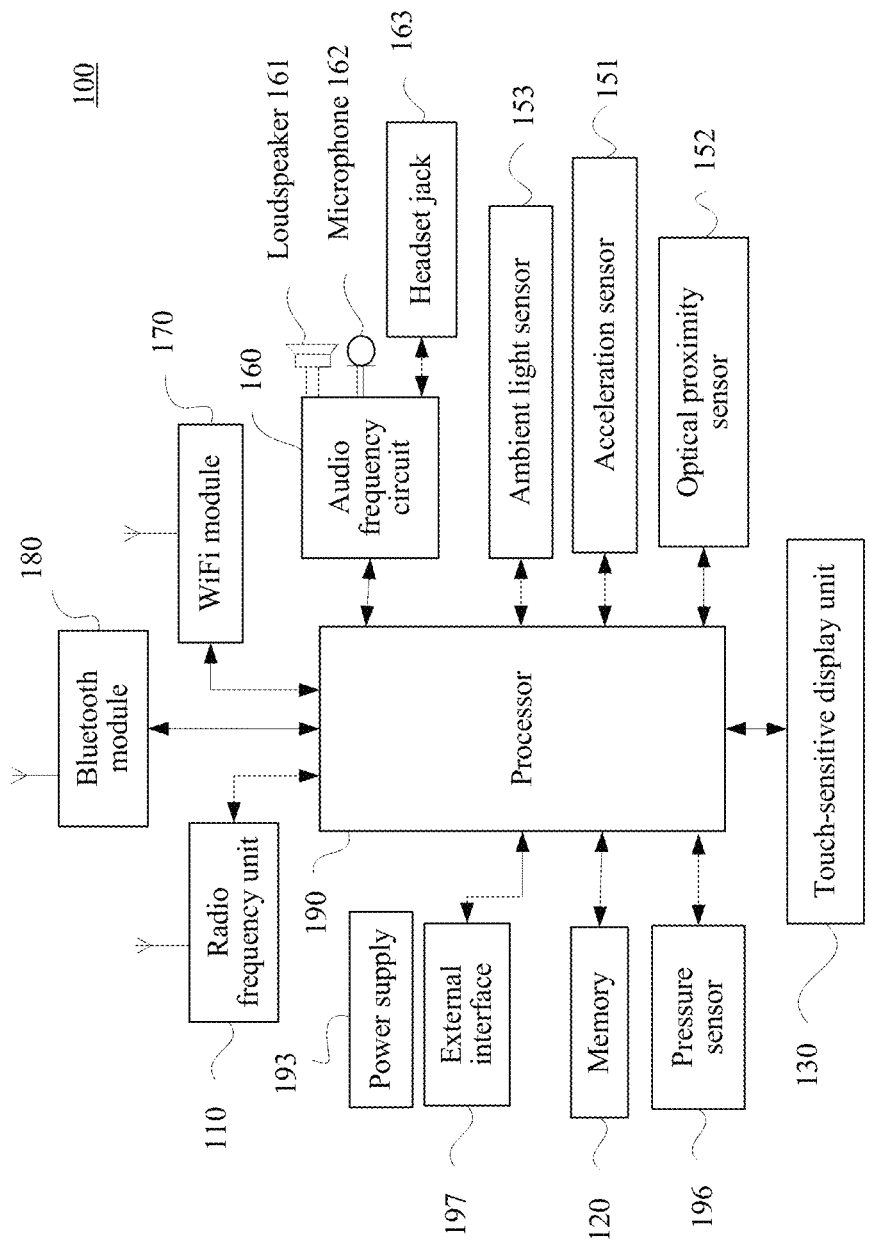
FIG. 1 is a schematic diagram of an internal structure of a portable electronic device 100 according to an embodiment of the present invention.

FIG. 1 is a schematic diagram of an internal structure of a portable electronic device 100 according to an embodiment of the present invention. The electronic device 100 may include a component such as a touch-sensitive display unit 130, an acceleration sensor 151, a pressure sensor 196, an optical proximity sensor 152, an ambient light sensor 153, a memory 120, a processor 190, a radio frequency unit 110, an audio frequency circuit 160, a speaker 161, a microphone 162, a WiFi (wireless fidelity, wireless fidelity) module 170, a Bluetooth module 180, a power supply 193, or an external interface 197.

It may be understood by persons skilled in the art that FIG. 1 is only an example of a portable electronic device, and does not constitute a limitation on the portable electronic device. The portable electronic device may include more or fewer components than components shown in the figure, or may combine some components, or may have different components.

For convenience, the touch-sensitive display unit 130 is sometimes referred to as a "touchscreen", or may be referred to as or called a touch-sensitive display system, or may be referred to as a display having a touch-sensitive surface (touch-sensitive surface). The display having the touch-sensitive surface includes the touch-sensitive surface and a display screen, and may display a screen UI, or may receive a touch action.

The touch-sensitive display unit 130 provides an input interface and an output interface between a device and a user. The touch-sensitive display unit 130 may collect a touch operation of the user on or near the touch-sensitive display unit 130, such as an operation of the user on the touch-sensitive display unit 130 or near the touch-sensitive display unit 130 by using any appropriate object such as a finger 202, a knuckle 400, or a stylus. The touch-sensitive display unit 130 may detect touch information and send the touch information to the processor 190. The touch information may include the touch action, a touch-sensitive surface grid capacitance, or touch point coordinates. The touch-sensitive display unit can receive and execute a command sent by the processor 190. The touch-sensitive display unit 130 displays visual output. The visual output may include a graph, a text, an identifier, a video, or any combination thereof (collectively referred to as a "graph"). In some embodiments, some of the visual output or all of the visual output may be corresponding to a display UI object.

The touch-sensitive display unit 130 may use an LCD (liquid crystal display) technology, an LPD (light emitting polymer display) technology, or an LED (light emitting diode) technology, but another display technology may be used in another embodiment. The touch-sensitive display unit 130 may detect touch and any movement or interruption thereof by using any technology of multiple touch sensing technologies that are already known or to be developed in the future, another proximity sensor array, or another element that is configured to determine one or more points that touch the touch-sensitive display unit 130. The multiple touch sensing technologies include but are not limited to capacitive, resistive, infrared, and surface acoustic wave technologies. For example, a projected mutual capacitance sensing technology is used in an embodiment.

The user may touch the touch-sensitive display unit 130 by using any appropriate object or an annex such as a stylus, a finger, or a knuckle. In some embodiments, the display UI is designed as knuckle-based touch working together with a gesture. In some other embodiments, the display UI is designed as finger-based touch working together with a gesture. In some other embodiments, the display UI is designed as pressure-based touch working together with a gesture. In some embodiments, a device translates rough input of the touch into an accurate pointer/cursor location or a command so as to execute an action expected by the user.

In some embodiments, in addition to the touch-sensitive display unit, the device 100 may include a touch panel (not shown) that is configured to activate or deactivate a specific function. In some embodiments, the touch panel is a touch-sensitive area of the device. The touch panel is different from the touch-sensitive display unit. The touch panel does not display the visual output. The touch panel may be a touch-sensitive surface separated from the touch-sensitive display unit 130, or an extension part of a touch-sensitive surface formed by the touch-sensitive display unit.

The acceleration sensor 151 may obtain a value of an acceleration in each direction (generally three axes). In addition, the acceleration sensor 151 may be further configured to detect a value and a direction of gravity when a terminal is still, or may be used in an application for identifying a mobile phone posture (such as landscape-to-portrait switch, a related game, and magnetometer posture calibration), a function related to vibration identification (such as a pedometer or a knock), or the like. In this embodiment of the present invention, the acceleration sensor 151 is configured to obtain a Z-axis direction gravity acceleration signal generated when a touch action of the user touches the touch-sensitive display unit.

The pressure sensor 196 may detect whether pressure is applied on the electronic device 100, and may determine a magnitude of the pressure applied on the electronic device 100 and transfer a value of the detected pressure to the processor 190. The pressure sensor 193 may be installed in a part that is in the electronic device 100 and whose pressure needs to be detected. If the pressure sensor 196 is installed in a display module, touch input and a pressure touch action may be distinguished based on a signal that is output by the pressure sensor 196. The signal that is output by the pressure sensor 196 may further indicate pressure applied on the display. For example, if a magnitude of pressure applied on the display by the touch input is 1, pressure that is applied on the display and that is greater than 2 is identified as the pressure touch action.

The electronic device 100 may further include one or more optical proximity sensors 152, configured to close and disable a touch function of the touch-sensitive surface when the electronic device 100 is relatively close to the user (for example, the electronic device 100 is near an ear when the user is making a call), so as to avoid misoperation of the user on the touch-sensitive display unit. The electronic device 100 may further include one or more ambient light sensors 153, configured to keep the touch-sensitive display unit closed when the electronic device 100 is in a pocket of the user or another dark area, so as to avoid unnecessary battery power consumption or misoperation when the electronic device 100 is in a locked state. In some embodiments, the optical proximity sensor and the ambient light sensor may be integrated into one component, or may be used as two independent components. For the electronic device 100, another sensor such as a gyroscope, a barometer, a hygrometer, a thermometer, or an infrared sensor may be further configured, and details are not described herein. Although FIG. 1 shows the optical proximity sensor and the ambient light sensor, it may be understood that the optical proximity sensor and the ambient light sensor are not mandatory parts of the electronic device 100, and may be completely omitted according to a need without changing the essence of the present invention.

The memory 120 may be configured to store an instruction and data. The memory 120 may mainly include an instruction storage area and a data storage area. The data storage area may store preset track information, a characteristic of a preset boundary such as a location, a shape, or a color, correlativity between application programs, or the like. The instruction storage area may store an operating system, an instruction required by at least one function, or the like. The instruction may enable the processor 190 to execute the following method, where the method specifically includes: when a touch gesture acting on the touch-sensitive surface is detected, and it is determined that the touch gesture is a knuckle touch gesture, splitting a display UI of the display into at least two display areas in response to the knuckle touch gesture.

The processor 190 is a control center of the electronic device 100. The processor 190 connects to various parts of an entire mobile phone by using various interfaces and lines, and executes various functions of the electronic device 100 and processing data by running or executing the instruction stored in the memory 120 and by invoking the data stored in the memory 120, so as to perform overall monitoring on the mobile phone. Optionally, the processor 190 may include one or more processing units. The processor 190 may integrate an application processor and a modem processor. The application processor mainly processes the operating system, the display UI, an application program, or the like, and the modem processor mainly processes wireless communications. It may be understood that the modem processor may not be integrated into the processor 190 either. In some embodiments, the processor and the memory may be implemented on a single chip. In some embodiments, the processor and the memory may be separately implemented on independent chips. In this embodiment of the present invention, the processor 190 is further configured to invoke the instruction in the memory to implement: when the touch gesture acting on the touch-sensitive surface is detected, and it is determined that the touch gesture is the knuckle touch gesture, splitting the display UI of the display into the at least two display areas in response to the knuckle touch gesture.

The radio frequency unit 110 may be configured to receive and send a signal in an information receiving or sending process or in a call process. Particularly, after downlink information of a base station is received, the downlink information is transferred to the processor 190 for processing. In addition, uplink data of the mobile phone is sent to the base station. Generally, an RF circuit includes but is not limited to an antenna, at least one amplifier, a transceiver, a coupler, a low noise amplifier (Low Noise Amplifier, LNA), a duplexer, or the like. In addition, the radio frequency unit 110 may further communicate with a network device and another device by means of wireless communications. The wireless communications may use any communications standard or protocol, which includes but is not limited to a Global System for Mobile Communications (Global System for Mobile communication, GSM), a general packet radio service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an email, a short messaging service (Short Messaging Service, SMS), or the like.

The audio frequency circuit 160, the speaker 161, and the microphone 162 may provide an audio interface between the user and the electronic device 100. The audio frequency circuit 160 may transmit an electrical signal to the speaker 161, where the electrical signal is a result of converting received audio data, and the speaker 161 converts the electrical signal into a sound signal for outputting. The microphone 162 converts a collected sound signal into an electrical signal. The audio frequency circuit 160 receives and converts the electrical signal into audio data. After being output to the processor 190 for processing, the audio frequency data is sent to, for example, another terminal by using the radio frequency unit 110, or the audio frequency data is output to the memory 120 for further processing. The audio frequency circuit may further include a headset jack 163, configured to provide a connection interface between the audio frequency circuit and a headset.

WiFi is a short-distance radio transmission technology. The electronic device 100 may use the WiFi module 170 to help the user receive and send an email, browse a web page, gain access to streaming media, or the like. The WiFi module 170 provides wireless broadband Internet access for the user. Although FIG. 1 shows the WiFi module 170, it may be understood that the WiFi module 170 is not a mandatory part of the electronic device 100, and may be completely omitted according to a need without changing the essence of the present invention.

Bluetooth is a short-distance wireless communications technology. By using a Bluetooth technology, communication between mobile communications terminal devices such as a palmtop computer, a notebook computer, and a mobile phone can be effectively simplified, and communication between the foregoing devices and the Internet (Internet) can also be successfully simplified. The electronic device 100 makes data transmission between the electronic device 100 and the Internet become faster and more efficient by using the Bluetooth module 180, and this paves the way for wireless communications. The Bluetooth technology is an open solution that can implement voice and data radio transmission. Although FIG. 1 shows the WiFi module 170, it may be understood that the WiFi module 170 is not a mandatory part of the electronic device 100, and may be completely omitted according to a need without changing the essence of the present invention.

The electronic device 100 further includes the power supply 193 (such as a battery) that supplies power for various parts. The power supply may logically connect to the processor 190 by using a power management system 194, so as to implement functions of managing power charging, power discharging, power consumption, or the like by using the power management system 194.

The electronic device 100 further includes an external interface 197, and the external interface may be a standard Micro USB interface, or may be a multi-pin connector. The external interface 197 may be configured to connect the electronic device 100 to another apparatus for communication, or may be configured to connect to a charger to charge the electronic device 100.

The electronic device 100 may further include a camera, a flashlight, or the like, which is not shown though and is not described in detail herein.

An electronic device 100 is used as an example in the following to describe a method for implementing quick screen splitting.

Figure 2:
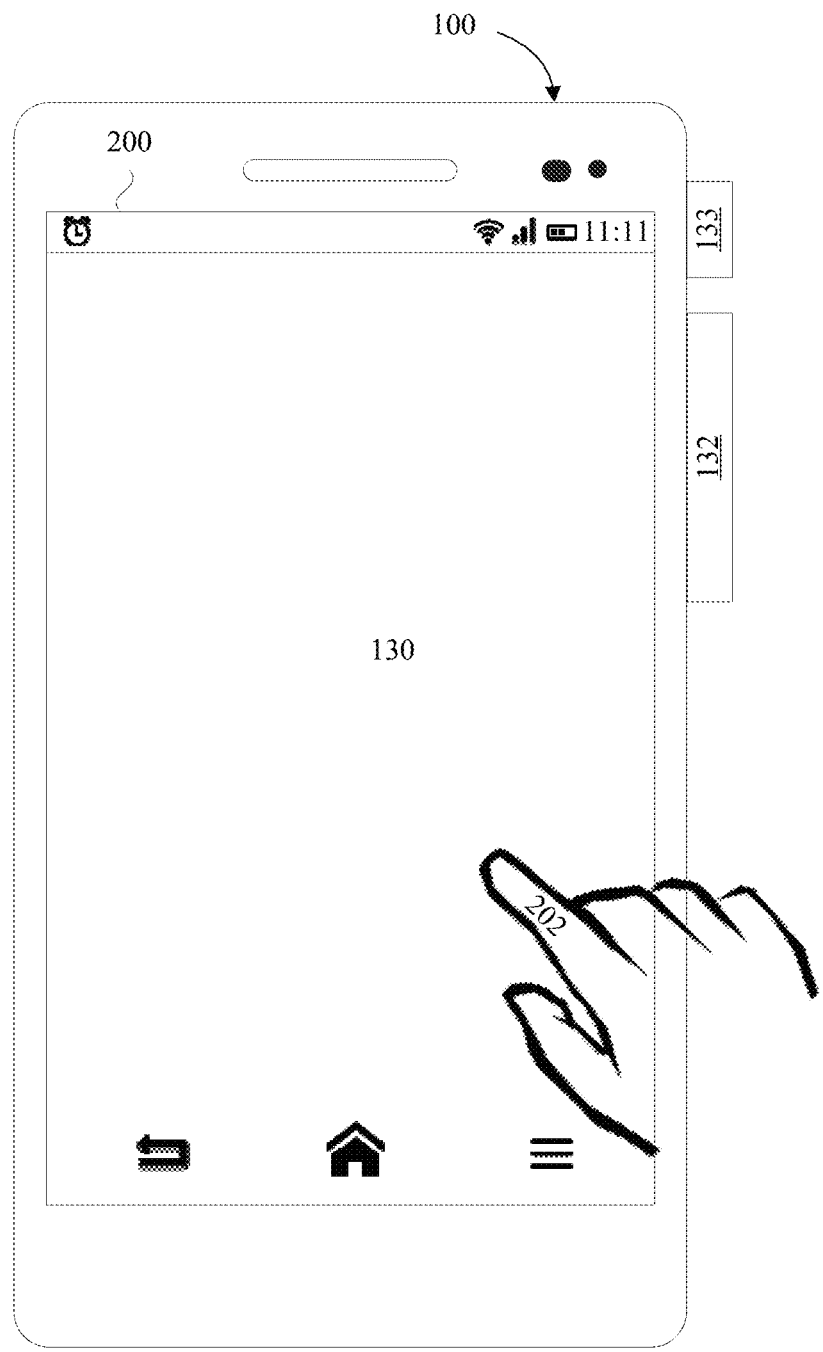
FIG. 2 is a schematic diagram of an external structure of a portable electronic device 100 according to an embodiment of the present invention.

FIG. 2 is a schematic diagram of an appearance of an electronic device 100 according to an embodiment of the present invention, and the electronic device 100 includes a touch-sensitive display unit 130, an on/off button 133, and a volume control button 132. A location of each physical button in FIG. 2 is merely an example, and the location of the physical button in an actual product may randomly change. In this embodiment, the electronic device 100 may further include an acceleration sensor 151, a microphone 162, a speaker 161, an external interface 197, a headset jack 163, or a pressure sensor 196. FIG. 2 shows a display UI 200 of the touch-sensitive display unit of the electronic device 100. As shown in FIG. 2, the display UI 200 may display information such as a virtual key, battery electric quantity, or time. It may be understood by persons skilled in the art that the display UI shown in FIG. 2 is merely an example display UI, other information may be further displayed, and this is not specifically limited in the present invention. An electronic device that carries an Android operating system is used as an example in FIG. 2, and the present invention may be further applied to an electronic device that carries another operating system such as iOS or Windows.

In this embodiment, the touch-sensitive display unit 130 may receive touch input of a user. By using the touch-sensitive display unit 130 as a main input or control apparatus for operating the electronic device 100, a quantity of physical input or control apparatuses on the electronic device 100 may be reduced. As shown in FIG. 2, the display UI 200 may be presented by using the touch-sensitive display unit. In this embodiment, the touch-sensitive display unit may be referred to as a "menu button". In some other embodiments, the "menu button" may be a physical button or another physical input or control apparatus. The pressure sensor 196 may detect whether pressure is applied on the electronic device 100, and may determine a magnitude of the pressure applied on the electronic device 100. In some embodiments, the pressure sensor 196 may be integrated into a display in an overlapping form, or may be an independent component. Based on the pressure sensor 196, pressure applied on the display may be identified as finger touch input or a pressure touch action. The acceleration sensor 151 is configured to obtain a Z-axis gravity acceleration signal of a touch action of the user on the touch-sensitive display unit. A power supply of the electronic device 100 may be turned on or turned off by pressing and keeping the on/off button in a pressed state until a preset time interval ends. The electronic device 100 may be locked by pressing the on/off button and releasing the on/off button before the preset time interval. In another embodiment, voice input that is used to activate some functions may be received by using the microphone 162.

Figure 3:
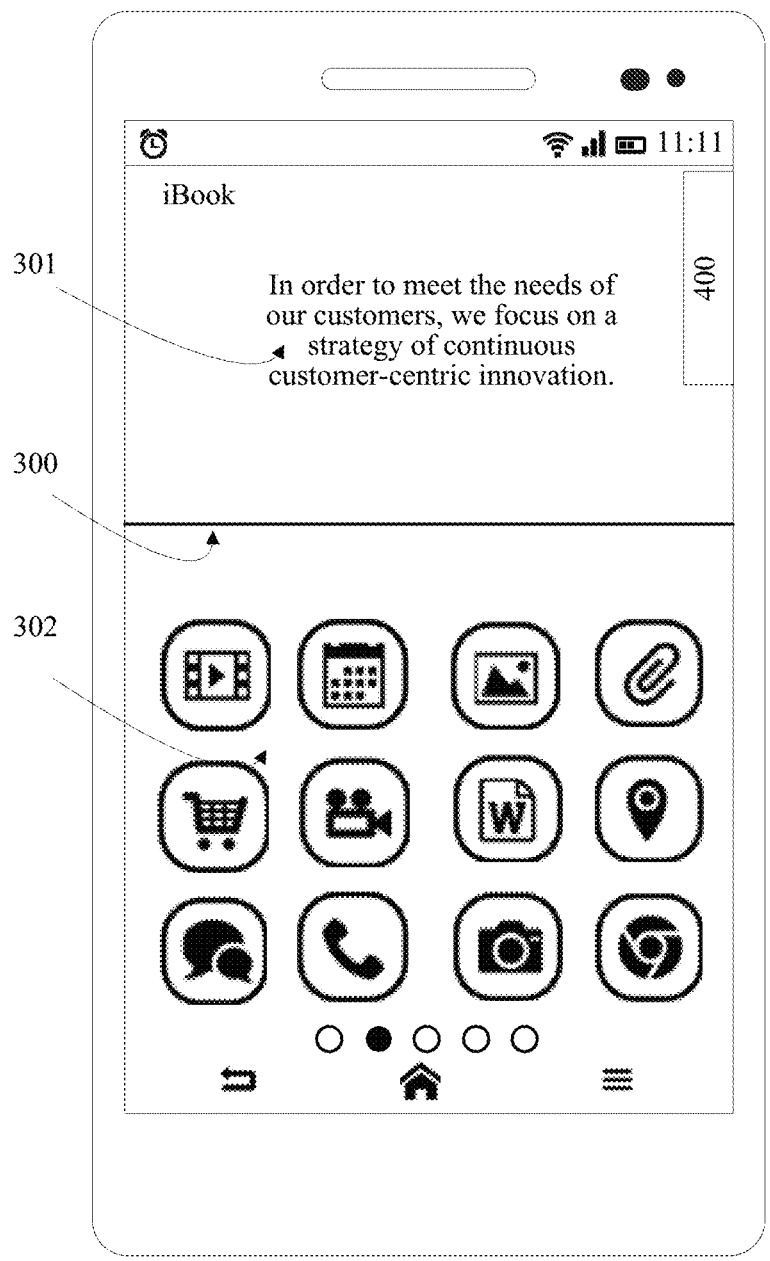
FIG. 3 is a schematic diagram of a display UI after screen splitting according to an embodiment of the present invention.

FIG. 3 is a schematic diagram of a display UI after screen splitting according to an embodiment of the present invention. A display UI 200 after screen splitting includes a boundary 300, a first display area 301, and a second display area 302. The first display area 301 and the second display area 302 are respectively located on two sides of the boundary 300. It may be understood by persons skilled in the art that the first display area 301 and the second display area 302 may be arranged from top to bottom, or may be arranged from left to right. A specific arrangement manner is not specifically limited in the present invention.

A screen splitting method provided in this embodiment of the present invention may be executed on a portable electronic device (such as the electronic device 100 in FIG. 1 or FIG. 2). The electronic device 100 includes a touch-sensitive display unit. The touch-sensitive display unit is also referred to as a display having a touch-sensitive surface. In some embodiments, some operations in the method may be combined, and/or a sequence of some operations may be changed.

This embodiment of the present invention provides a method for implementing quick screen splitting. The screen splitting may be splitting a display UI of the display into at least two display areas. This method helps a user to simply and quickly perform screen splitting on the display UI by using relatively few operation steps. Operation steps of the screen splitting are simplified, and user experience is improved.

The method for implementing screen splitting provided in this embodiment of the present invention may include the following steps:

Step 1: When a touch gesture acting on the touch-sensitive surface is detected, determine whether the touch gesture matches a preset gesture.

Step 2: When it is determined that the touch gesture matches the preset gesture, split the display UI of the display into at least two display areas in response to the touch gesture.

It may be understood by persons skilled in the art that the touch gesture may include a touch action. For example, a tap gesture includes two touch actions of pressing and lifting, and a sliding gesture includes three touch actions of pressing, moving, and lifting. After receiving a touch action performed on the touch-sensitive surface, the touch-sensitive display unit transfers touch information to a processor. The touch information may include touch point coordinates, touch-sensitive surface grid capacitance information, or one or more signals in the touch action. The touch action may include an action such as pressing, moving, or lifting. In an implementation, a terminal device periodically detects whether the touch action is performed on the touch-sensitive surface.

The preset gesture may be a knuckle touch gesture, a multipoint touch gesture, or a pressure touch gesture. The preset gesture may be pre-stored in a memory 120.

When the touch action performed on the touch-sensitive surface is detected, a touch gesture including the detected touch action is compared with the preset gesture to determine whether the touch gesture matches the preset gesture (step 1).

An implementation for determining whether the touch gesture matches the preset gesture is determining whether the touch gesture is the knuckle touch gesture. It may be determined, based on the touch information and a Z-axis direction acceleration signal generated by the touch action, whether the touch action is a knuckle touch action. A gesture including the knuckle touch action is the knuckle touch gesture. For example, a knuckle tap gesture includes two knuckle touch actions of pressing and lifting, and a knuckle sliding gesture includes three knuckle touch actions of pressing, moving, and lifting. A movement track between the pressing and the lifting is a track of the knuckle touch gesture.

The following describes an implementation for determining whether the touch action is the knuckle touch action.

When a touch-sensitive surface grid capacitance generated by the touch action performed on the touch-sensitive surface is within a first preset capacitance range, a quantity of non-zero capacitance grids is less than a preset value, and the Z-axis direction acceleration signal is within a first preset acceleration range in a preset time, it may be determined that the touch action is the knuckle touch action. When a touch-sensitive surface grid capacitance generated by the touch action performed on the touch-sensitive surface is within a second preset capacitance range, a quantity of non-zero capacitance grids is greater than or equal to a preset value, and the Z-axis direction acceleration signal is within a second preset acceleration range in a preset time, it may be determined that the touch action is a finger touch action.

For example, when the touch-sensitive surface grid capacitance generated by the touch action performed on the touch-sensitive surface indicates that a maximum capacitance is within the first preset capacitance range (for example, less than or equal to 0.42 pF), a quantity of grids that are distributed with a non-zero capacitance is less than 7, and the Z-axis direction acceleration signal is within the first preset acceleration range in the preset time (for example, the acceleration signal is greater than 3 g in 5 ms), it may be determined that the touch action is the knuckle touch action. When the touch-sensitive surface grid capacitance generated by the touch action performed on the touch-sensitive surface indicates that a maximum capacitance is within the second preset capacitance range (for example, greater than 0.42 pF, and less than or equal to 0.46 pF), a quantity of grids that are distributed with a non-zero capacitance is greater than or equal to 7, and the Z-axis direction acceleration signal is within the second preset acceleration range in the preset time (for example, the acceleration signal is less than 2 g in 5 ms, where g is a gravity acceleration), it may be determined that the touch action is the finger touch action.

It may be understood that the finger touch action in this embodiment of the present invention is not necessarily triggered by a finger, and may be that another object touches the touch-sensitive display unit 130. Any action that meets a determining condition of the foregoing finger touch action may be referred to as the finger touch action in this embodiment of the present invention. The knuckle touch action in this embodiment of the present invention is not necessarily triggered by a knuckle, and may be that another object taps or touches the touch-sensitive display unit 130 at a high speed. Any action that meets the determining condition of the foregoing knuckle touch action may be referred to as the knuckle touch action in this embodiment of the present invention. A gesture including the knuckle touch action is the knuckle touch gesture.

Another implementation for determining whether the touch gesture matches the preset gesture is determining whether the touch gesture is the pressure touch gesture. It may be determined, based on the touch information and pressure applied on the touch-sensitive display unit, whether the touch action is a pressure touch action. The touch gesture may include the touch action. In this embodiment of the present invention, the pressure touch gesture may include keeping a pressed state after a pressure touch pressing action, a finger touch movement action, and a touch lifting action, or may include keeping a pressed state after a pressure touch pressing action, a pressure touch movement action, and a touch lifting action. A movement track between pressing and lifting is a track of the pressure touch gesture.

When a value of pressure applied by the touch action on the display is within a first preset pressure value range, it may be determined that the touch action is the pressure touch action. When a value of pressure applied by the touch action on the display is within a second preset pressure value range, it may be determined that the touch action is the finger touch action.

In this embodiment, the value of pressure may represent a value of the pressure, or may represent a magnitude of the pressure.

For example, if a magnitude of the pressure applied by the finger touch action on the display is 1, a touch action whose magnitude of pressure applied on the display is greater than or equal to 2 is identified as the pressure touch action.

For example, a value of pressure applied by the finger touch action on the display is approximately 70 g, and a touch action whose value of pressure applied on the display is greater than 140 g is the pressure touch action. It may be understood that the value of pressure and a pressure magnitude relationship in this embodiment of the present invention are merely an implementation of this embodiment of the present invention, and the value of pressure and the pressure magnitude relationship may be properly adjusted according to a design requirement.

Still another implementation for determining whether the touch gesture matches the preset gesture may be determining, based on the touch information, whether the touch gesture is the multipoint touch gesture. One or more touch points that simultaneously or successively touch the touch-sensitive surface are identified based on the touch information, and it is further determined whether the touch gesture is the multipoint touch gesture. It may be understood by persons skilled in the art that the multi-point touch may be that two fingers, three fingers, four fingers, five fingers, or even more fingers simultaneously or successively touch the touch-sensitive surface. A track of the multipoint touch gesture may be a movement track that is of a central point of the multiple touch points simultaneously or successively touching the touch-sensitive surface and that is on the touch-sensitive surface.

Optionally, when it is determined that the touch gesture matches the preset gesture, it is determined whether a movement distance of the touch gesture is greater than a preset distance threshold, and/or whether a track of the touch gesture matches a preset track. For example, the preset distance threshold may be ½ of a width of the display. The preset track may be a track of a straight line or approximate to a straight line, or may be a track of a curve or approximate to a curve that can be detected by an electronic device of any form, such as an S type, a Z type, or an X type.

Optionally, when it is determined that the touch gesture matches the preset gesture, it is determined whether a start location of the touch gesture is close to a predetermined area of a first edge of the touch-sensitive display unit, and/or whether an end location of the touch gesture is beyond the touch-sensitive display unit or is close to a predetermined area of a second edge of the touch-sensitive display unit. The first edge and the second edge may be two different edges that are oppositely disposed, and are respectively located on two sides of the touch-sensitive display unit. For example, the first edge is a left edge of the touch-sensitive display unit, and the second edge is a right edge of the touch-sensitive display unit, or the first edge is a top edge of the touch-sensitive display unit, and the second edge is a bottom edge of the touch-sensitive display unit. The end location of the touch gesture being beyond a screen means that the track of the touch gesture slides in a direction beyond a valid area of the touch-sensitive display unit.

Optionally, when it is determined that the touch gesture matches the preset gesture, it is determined whether an angle of an included angle between the track of the touch gesture and a horizontal axis direction or a vertical axis direction is less than a preset angle.

When it is determined that the touch gesture matches the preset gesture, the display UI of the display is split into the at least two display areas in response to the touch gesture (step 2).

The display UI of the display is split into the at least two display areas, and a running UI of a first application program that runs on the display UI before screen splitting is displayed in at least one of the display areas. It may be understood that a size of the running UI of the first application program is reduced.

For ease of description, splitting the display UI of the display into two display areas is used as an example in this embodiment of the present invention. The two display areas may be arranged from left to right, or may be arranged from top to bottom. It may be understood by persons skilled in the art that the display UI may be split into three, four, or more display areas according to the screen splitting method in this embodiment of the present invention, and this is not listed one by one herein.

An implementation for splitting the display UI into the two display areas may be splitting the display UI into a first display area and a second display area according to a preset boundary. It may be understood that the size of the running UI of the first application program that runs on the display UI before the screen splitting is reduced according to a predetermined size. A characteristic such as a location, a shape, or a color of the preset boundary may be preset and stored in the memory 120. The preset boundary evenly splits the display UI of the display into the two display areas. The preset boundary may be a horizontal boundary, and evenly splits the display UI into two display areas with same areas, a top one and a bottom one. A display area above the boundary is the first display area, and a display area below the boundary is the second display area. The preset boundary may also be a vertical boundary, and evenly splits the display UI into two display areas with same areas, a left one and a right one. It may be understood by persons skilled in the art that a location of the preset boundary may be located in any location of the display UI, and this is not specifically limited in the present invention.

Another implementation for splitting the display UI into the two display areas may be splitting the display UI into a first display area and a second display area according to the track of the touch gesture. The implementation includes splitting the display UI of the display into the first display area and the second display area by using the track of the touch gesture as the boundary. The track of the touch gesture may be a gesture track of a straight line or approximate to a straight line, or may be a gesture track of a curve or approximate to a curve that can be detected by an electronic device of any form, such as an S type, a Z type, or an X type. The track of the touch gesture is the straight line. A movement direction of the touch gesture may be a horizontal direction, a vertical direction, or a direction that can be detected by the electronic device of any form. When the track of the touch gesture is a straight line of the horizontal direction, the boundary is a straight line of the horizontal direction. A display area above the boundary is the first display area, and a display area below the boundary is the second display area. When the track of the touch gesture is a straight line of the vertical direction, the boundary is a straight line of the vertical direction. A display area on the left of the boundary is the first display area, and a display area on the right of the boundary is the second display area.

Still another implementation for splitting the display UI into the two display areas may be performing a screen splitting operation according to a direction of the touch gesture and coordinates of the start location of the touch gesture. The display UI is split into a first display area and a second display area according to the direction of the touch gesture and the coordinates of the start location of the touch gesture. The implementation includes using the movement direction of the touch gesture as a direction of the boundary, and determining coordinates of the boundary according to the coordinates of the start location of the touch gesture. For example, when the movement direction of the touch gesture is the horizontal direction, the direction of the boundary is the horizontal direction, and a y-axis coordinate value of the boundary is a y-axis coordinate value of the start location of the touch gesture. A display area above the boundary is the first display area, and a display area below the boundary is the second display area. When the movement direction of the touch gesture is the vertical direction, the direction of the boundary is the vertical direction, and an x-axis coordinate value of the boundary is an x-axis coordinate value of the start location of the touch gesture. A display area on the left of the boundary is the first display area, and a display area on the right of the boundary is the second display area.

FIG. 4 to FIG. 7 show an example of a display UI for screen splitting according to a knuckle touch gesture. It may be understood by persons skilled in the art that the display UI shown in FIG. 4 to FIG. 7 may be further implemented according to a multi-point touch gesture and a pressure touch gesture. As shown in FIG. 4 to FIG. 7, a track of the knuckle touch gesture is used as a boundary. The boundary may also be a preset boundary, or the boundary may be determined according to a direction of the touch gesture and coordinates of a start location of the touch gesture. A direction of an arrow shown in the figure is a movement direction of the knuckle touch gesture, and a dashed line is a movement track of the knuckle touch gesture. A running UI of a first application program is displayed on the display UI before screen splitting. A manifestation of the display UI after the screen splitting is splitting the display UI into two display areas. The two display areas include a first display area and a second display area. The running UI of the first application program that runs before the screen splitting may be displayed in the first display area. It may be understood that a size of the running UI of the first application program before the screen splitting is reduced, and the second display area is generated in a display area except the reduced running UI of the first application program.

An implementation for the display UI after the screen splitting is that an identifier of one or more application programs related to the first application program may be displayed in the second display area for a user to select. When it is detected that the user selects an identifier of a second application program displayed in the second display area, the second application program is executed, and a running UI of the second application program is displayed in the second display area. Correlativity between the application programs may be preset and stored in a memory 120.

In this embodiment of the present invention, the identifier of the application program may be an icon of the application program.

Figure 4:
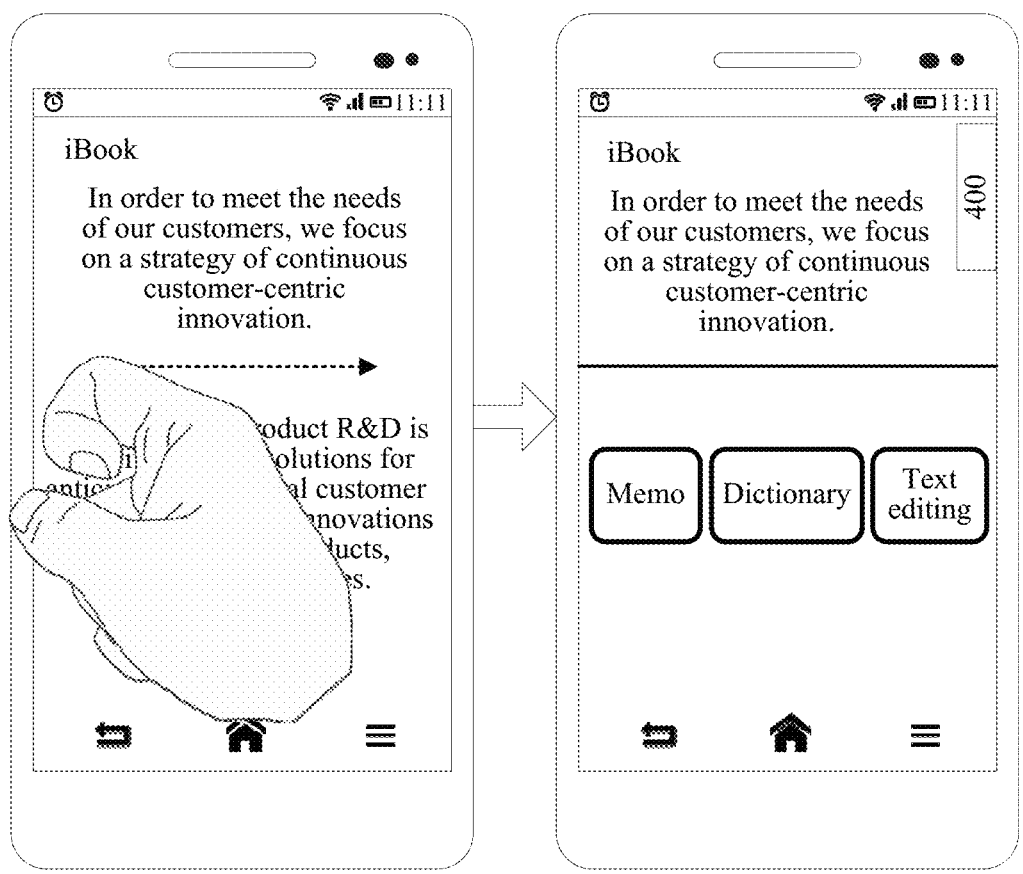
FIG. 4 is an example of a display UI for screen splitting according to a touch gesture according to an embodiment of the present invention.

FIG. 4 is an example of a display UI for screen splitting according to a touch gesture according to an embodiment of the present invention. As shown in FIG. 4, it is assumed that an "iBook", a "memo", a "dictionary", and "text editing" are preset as related applications, and correlativity between application programs is stored in a memory 120. A running UI of the "iBook" is displayed on a display UI before screen splitting. After the screen splitting, the running UI of the "iBook" is displayed in a first display area, and an identifier of an application related to the "iBook", such as the "memo", the "dictionary", or the "text editing", may be displayed in a second display area. It may be understood by persons skilled in the art that a display UI of the first display area reduces a size of the running UI of the "iBook" before the screen splitting. Optionally, a scroll bar 400 is displayed on a right side of the first display area. It may be further understood by persons skilled in the art that when it is detected that a user selects any identifier of the "memo", the "dictionary", or the "text editing", an application program corresponding to the selected identifier is executed, and a running UI of the application program corresponding to the selected identifier is displayed in the second display area.

Another implementation for the display UI after the screen splitting is: if there is only one second application program that is related to a first application program, a running UI of the first application program may be displayed in the first display area after the screen splitting, and a running UI of the second application program may be displayed in the second display area. That is, the second application program automatically runs and is displayed in the second display area after the screen splitting; therefore, a step of manually selecting the second application program by the user is omitted.

Figure 5:
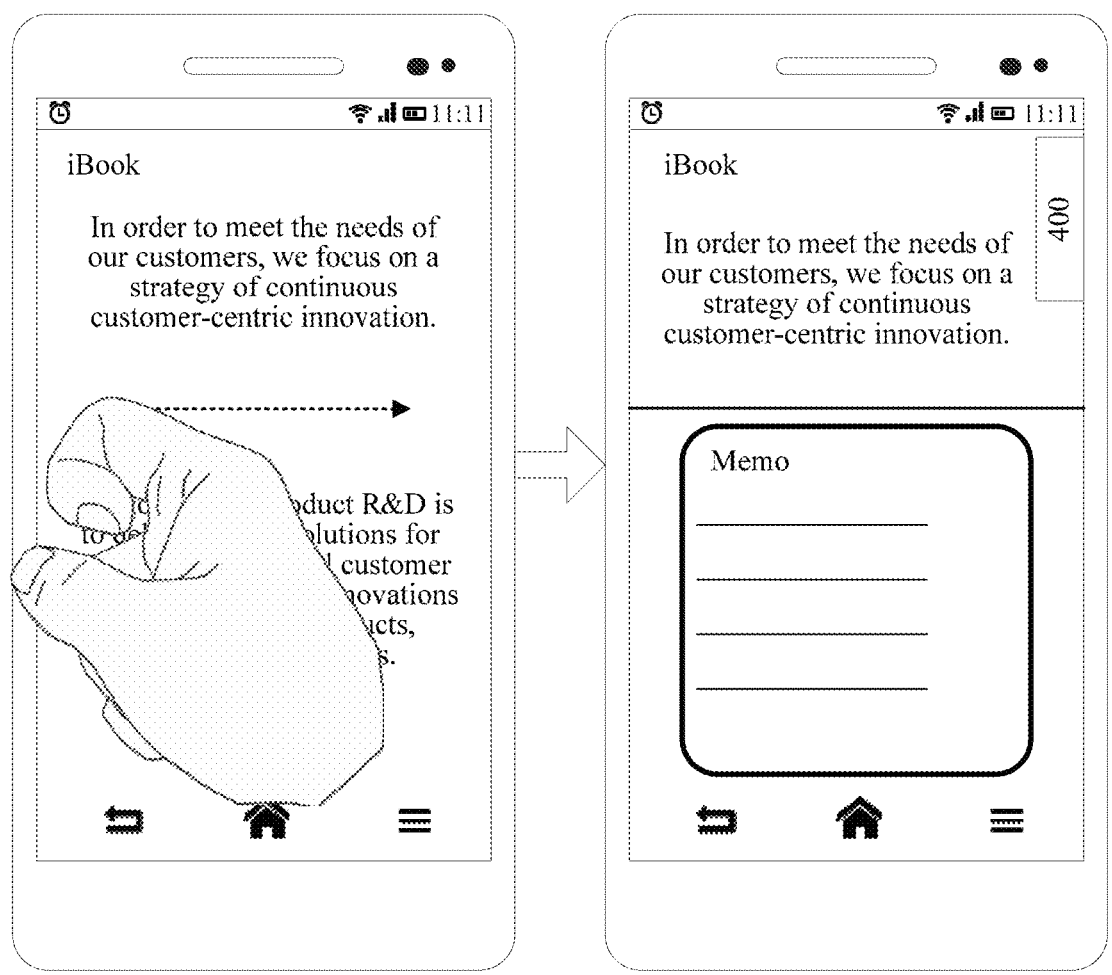
FIG. 5 is an example of another display UI for screen splitting according to a touch gesture according to an embodiment of the present invention.

FIG. 5 is an example of another display UI for screen splitting according to a touch gesture according to an embodiment of the present invention. As shown in FIG. 5, it is assumed that an "iBook" and a "memo" are preset as related applications. A running UI of the "iBook" is displayed on a display UI before screen splitting. After the screen splitting, the running UI of the "iBook" is displayed in a first display area, and a running UI of the "memo" is displayed in a second display area. In this way, it is convenient for a user to perform, in the running UI of the "memo", a related operation such as study notes on the "iBook".

Another implementation for the display UI after the screen splitting is displaying a running UI of a first application program in the first display area. A main menu UI such as a Home screen may be displayed in the second display area. An application program identifier is displayed on the main menu UI for the user to select. When it is detected that the user selects an identifier of a second application program displayed in the second display area, the second application program is executed, and a running UI of the second application program is displayed in the second display area.

Figure 6:
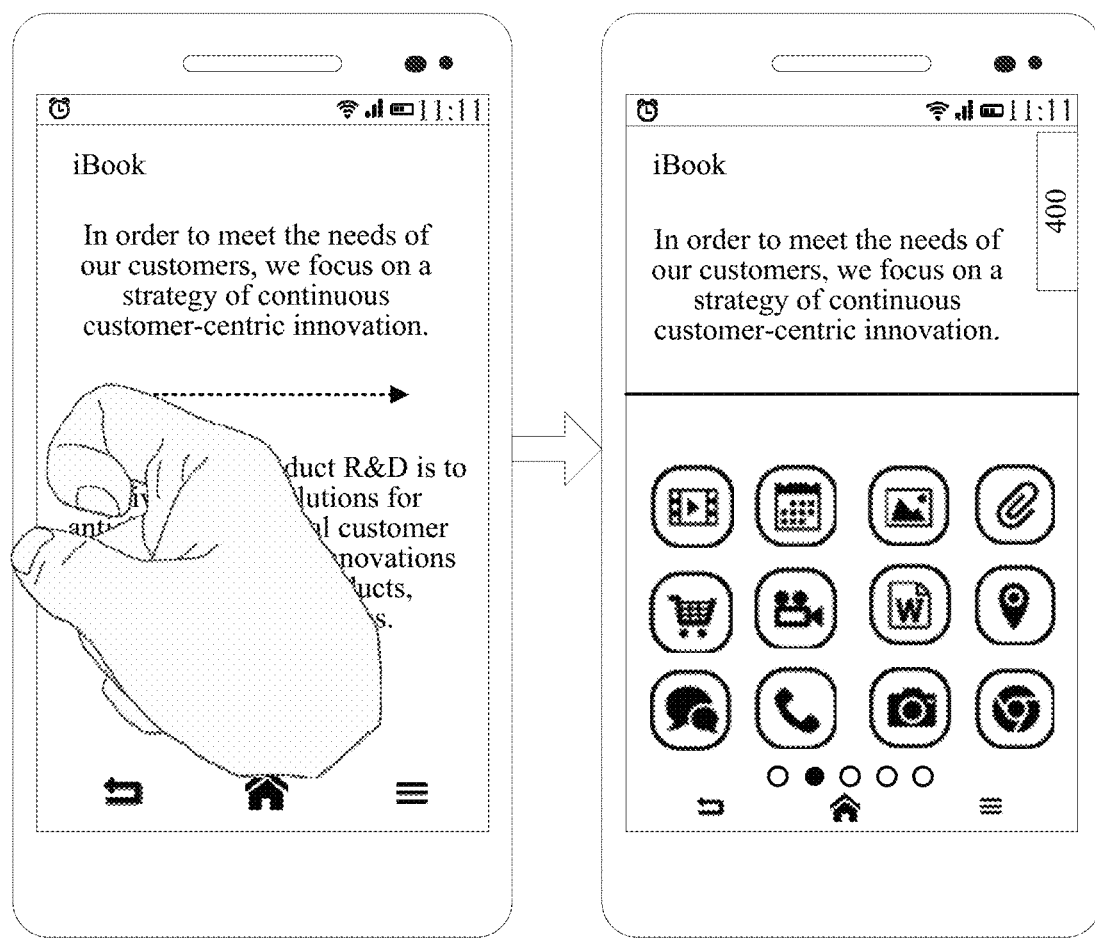
FIG. 6 is an example of still another display UI for screen splitting according to a touch gesture according to an embodiment of the present invention.

FIG. 6 is an example of still another display UI for screen splitting according to a touch gesture according to an embodiment of the present invention. As shown in FIG. 6, a running UI of an "iBook" is displayed on a display UI before screen splitting. After the screen splitting, the running UI of the "iBook" is displayed in a first display area, and a main menu UI is displayed in a second display area. The main menu UI includes an application program identifier for a user to select, for example, an identifier of an application program such as a "camera", a "message", or a "video". It may be understood that when it is detected that the user selects an identifier of any application program, the selected application program is executed, and a running UI of the selected application program is displayed in the second display area.

Yet another implementation for the display UI after the screen splitting is that an identifier (referred to as a "historical program identifier" hereinafter) of an application program recently executed by the user may be displayed in the second display area for the user to select. When it is detected that the user selects the historical program identifier, the selected application program is executed, and a running UI of the selected application program is displayed in the second display area. It may be understood by persons skilled in the art that a thumbnail of a running UI of a historical program may be further displayed in the second display area.

Figure 7:
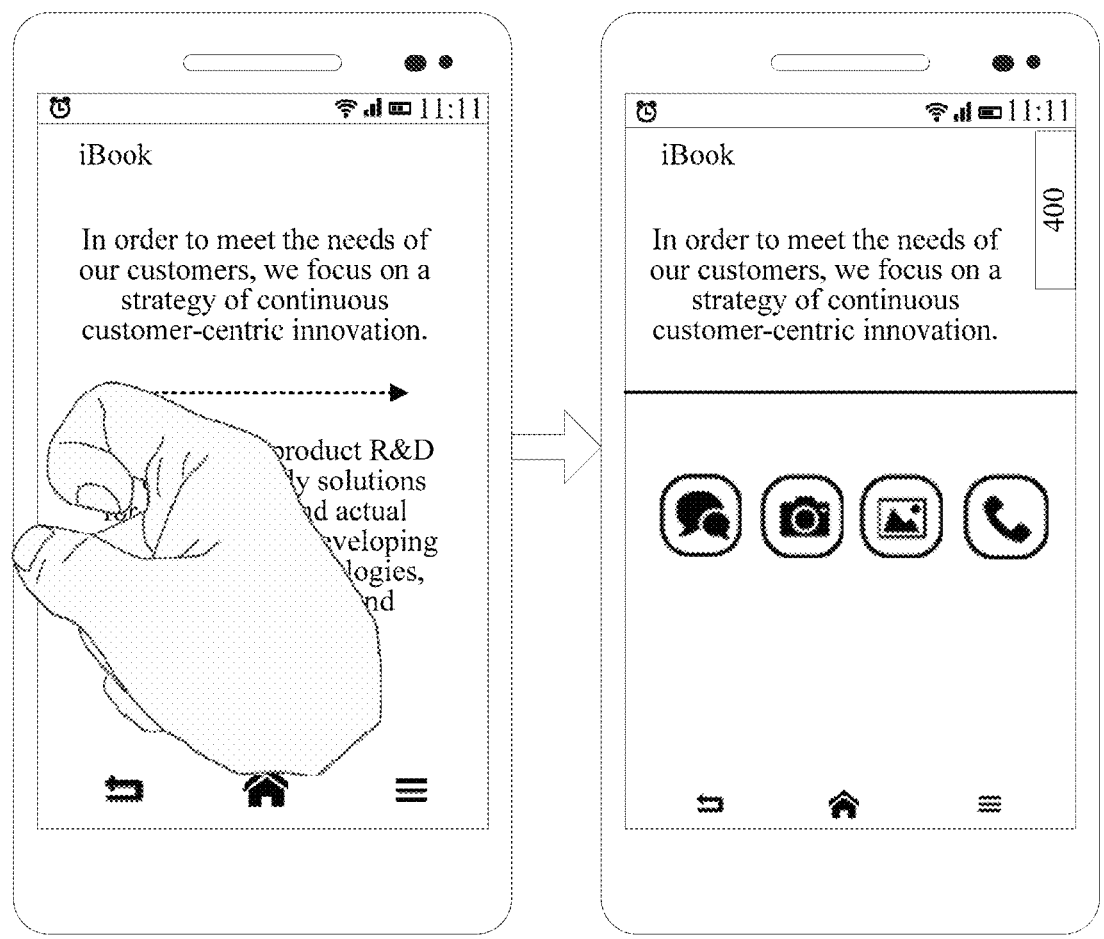
FIG. 7 is an example of yet another display UI for screen splitting according to a touch gesture according to an embodiment of the present invention.

FIG. 7 is an example of yet another display UI for screen splitting according to a touch gesture according to an embodiment of the present invention. As shown in FIG. 7, a running UI of an "iBook" is displayed on a display UI before screen splitting. It is assumed that a user executes application programs of a "message", a "camera", an "album", and a "phone" before the screen splitting. After the screen splitting, the running UI of the "iBook" is displayed in a first display area, and identifiers of the application programs of the "message", the "camera", the "album", and the "phone" are displayed in a second display area for the user to select. It may be understood that when it is detected that the user selects an identifier of any application, an application program corresponding to the selected identifier is executed, and a running UI of the application program corresponding to the selected identifier is displayed in the second display area.

Optionally, when an operation instruction of moving an identifier displayed in the second display area to the first display area is detected, the moved identifier or a running UI of an application program corresponding to the moved identifier is displayed in the first display area. For example, when the running UI of the "iBook" is displayed in the first display area, an identifier of an application program such as the "camera", the "message", or a "video" is displayed in the second display area, and an operation instruction of moving an identifier of the "camera" to the first display area is detected, a running UI of the "camera" is displayed in the first display area to replace the running UI of the "iBook". When a main menu UI is displayed in the first display area, the identifier of the application program such as the "camera", the "message", or the "video" is displayed in the second display area, and the operation instruction of moving the identifier of the "camera" to the first display area is detected, the identifier of the "camera" is moved to the main menu UI.

Optionally, when an operation instruction of moving content displayed in the second display area to the first display area is detected, the moved content is embedded into a running UI of a first application program. For example, when a running UI of "text editing" is displayed in the first display area, and an operation instruction of moving an identifier of an application program such as the "video" displayed in the second display area to the first display area is detected, a running UI or an identifier of the "video" is embedded into a running UI of the "text editing". When the running UI of the "text editing" is displayed in the first display area, and an operation instruction of moving a picture displayed in the second display area to the first display area is detected, the picture displayed in the second display area is embedded into the running UI of the "text editing".

Further, a location of a boundary may be adjusted after the screen splitting. When the location of the boundary on a touch-sensitive display unit is changed, a size and/or a location of a display area after the screen splitting is accordingly changed. When it is detected that time for pressing and holding down the boundary exceeds predetermined time, the boundary prompts, in a highlighted manner, the user to adjust the location of the boundary. The user may adjust the location of the boundary by touching the touch-sensitive display unit and moving the boundary.

Figure 8:
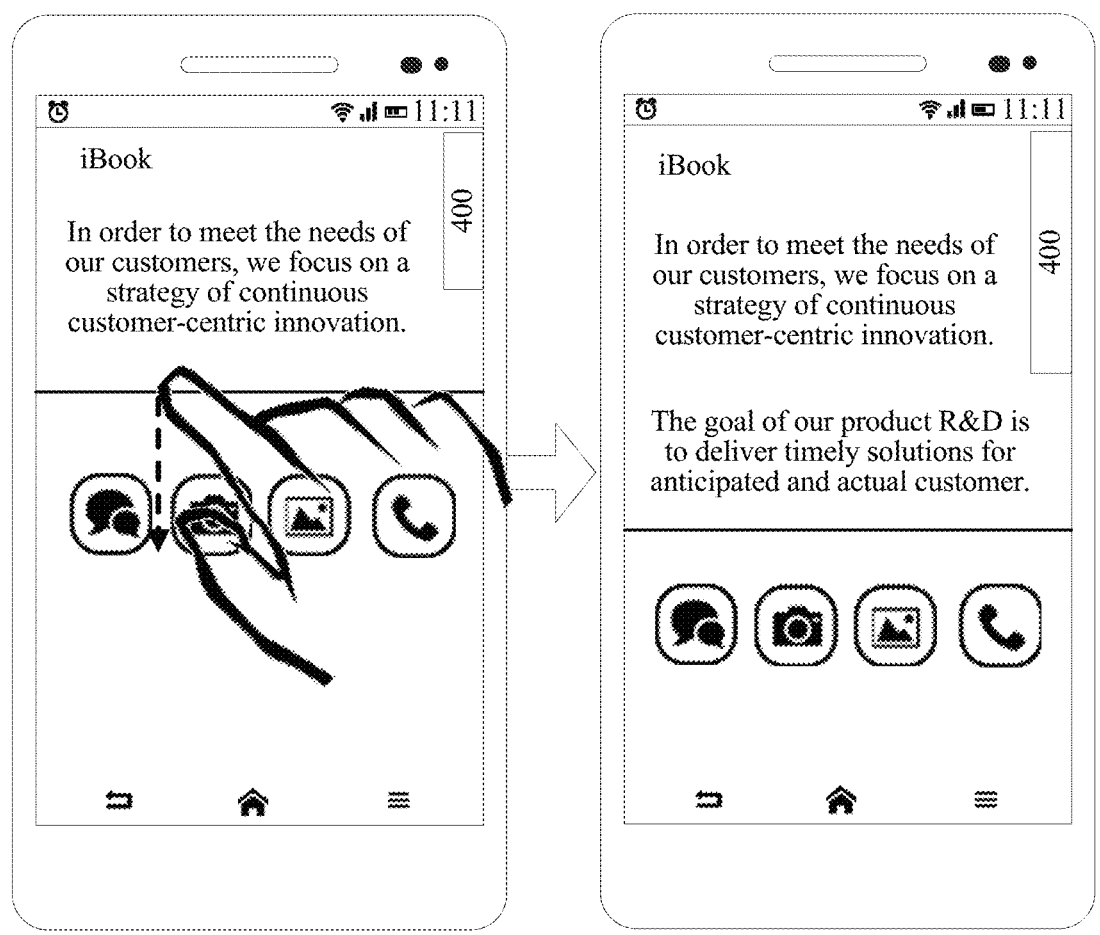
FIG. 8 is an example of a display UI for adjusting a location of a boundary according to a touch gesture according to an embodiment of the present invention.

FIG. 8 is an example of a display UI for adjusting a location of a boundary according to a touch gesture according to an embodiment of the present invention. As shown in FIG. 8, when it is detected that time for pressing and holding down a boundary exceeds predetermined time, the boundary is touched and moved so as to adjust a location of the boundary. It may be understood that when a touch gesture for adjusting the location of the boundary is moving from a first display area to a second display area, a size of a display UI of the first display area is increased and a size of a display UI of the second display area is reduced.

Further, when a display UI is split into the first display area and the second display area, a touch gesture acting on the two display areas is detected, and a track of the touch gesture matches a preset graph track, locations or display content of the first display area and the second display area are interchanged. The preset graph track may be a clockwise or an anti-clockwise arc rotation track or another track of any form that can be detected by an electronic device.

Figure 9:
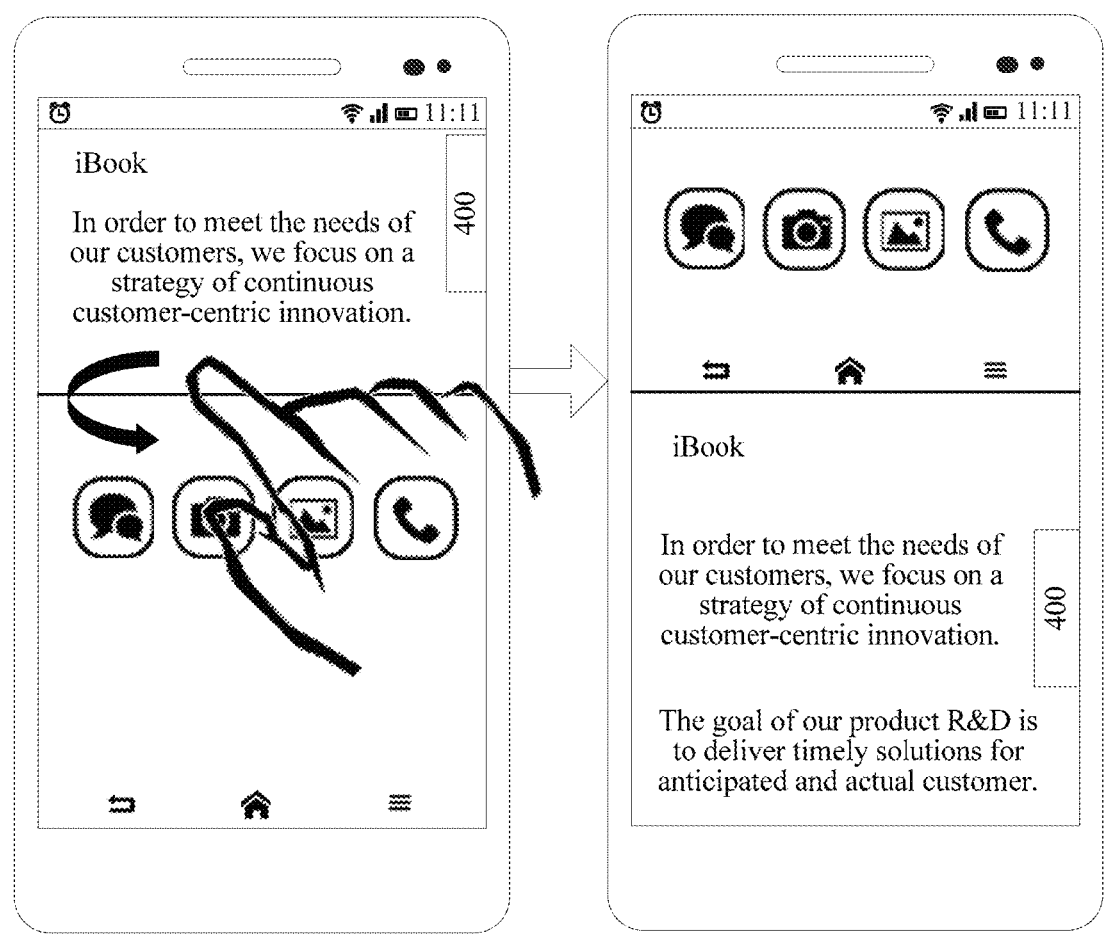
FIG. 9 is an example of a display UI for interchanging split screen display UIs according to a touch gesture according to an embodiment of the present invention.

FIG. 9 is an example of a display UI for interchanging split screen display UIs according to a touch gesture according to an embodiment of the present invention. As shown in FIG. 9, when a touch gesture acting on a first display area and a second display area is detected, and a track of the touch gesture is an anti-clockwise arc rotation track that matches a preset graph track, display content of the first display area and the second display area is interchanged.

Further, when a display UI is split into the first display area and the second display area, and a gesture for quitting a split screen UI is detected, the first display area and the second display area are combined into one display area, so as to quit the split screen UI. The quitting the split screen UI may be transferring a second application program in the second display area to be running in a background. After the second application program is transferred to be running in the background, if a user resumes a screen splitting operation, a running UI of the second application program may be displayed in a split screen area after screen splitting. An implementation for the gesture for quitting the split screen UI may be a touch gesture of sliding from the first display area to the second display area. A start location of a touch gesture for quitting the split screen UI may be in the first display area, and an end location of the touch gesture for quitting the split screen UI may be in the second display area. Another implementation for the gesture for quitting the split screen UI may be that two or more fingers simultaneously or successively touch a touch-sensitive display unit, and a distance between the fingers gradually decreases or increases after touching. A specific implementation for the quitting the split screen UI may be adaptively adjusted according to a specific design requirement, and is not specifically limited in the present invention.

After the split screen UI is quitted, and the first display area and the second display area are combined into the one display area, and when a split screen resuming touch gesture acting on the combined display area is detected, the combined display area is split into a split screen area before combination to resume the split screen UI. The split screen resuming touch gesture may be a touch gesture acting on the combined display area. The split screen resuming touch gesture may be a knuckle touch gesture, a multi-point touch gesture, or a pressure touch gesture that matches a preset gesture, or may be another gesture that is set according to a design requirement. This is not specifically limited in the present invention.

Further, when a touch gesture that matches the preset gesture and that acts on the split screen UI is detected, the split screen UI may be split into more display areas, such as a newly-added third display area. The split screen UI includes the first display area and the second display area. A main menu UI may be displayed in the third display area, or an identifier or a running UI of an application program that is related to an application program displayed in the first display area and/or the second display area may be displayed. This is not specifically limited in the present invention.

Figure 10:
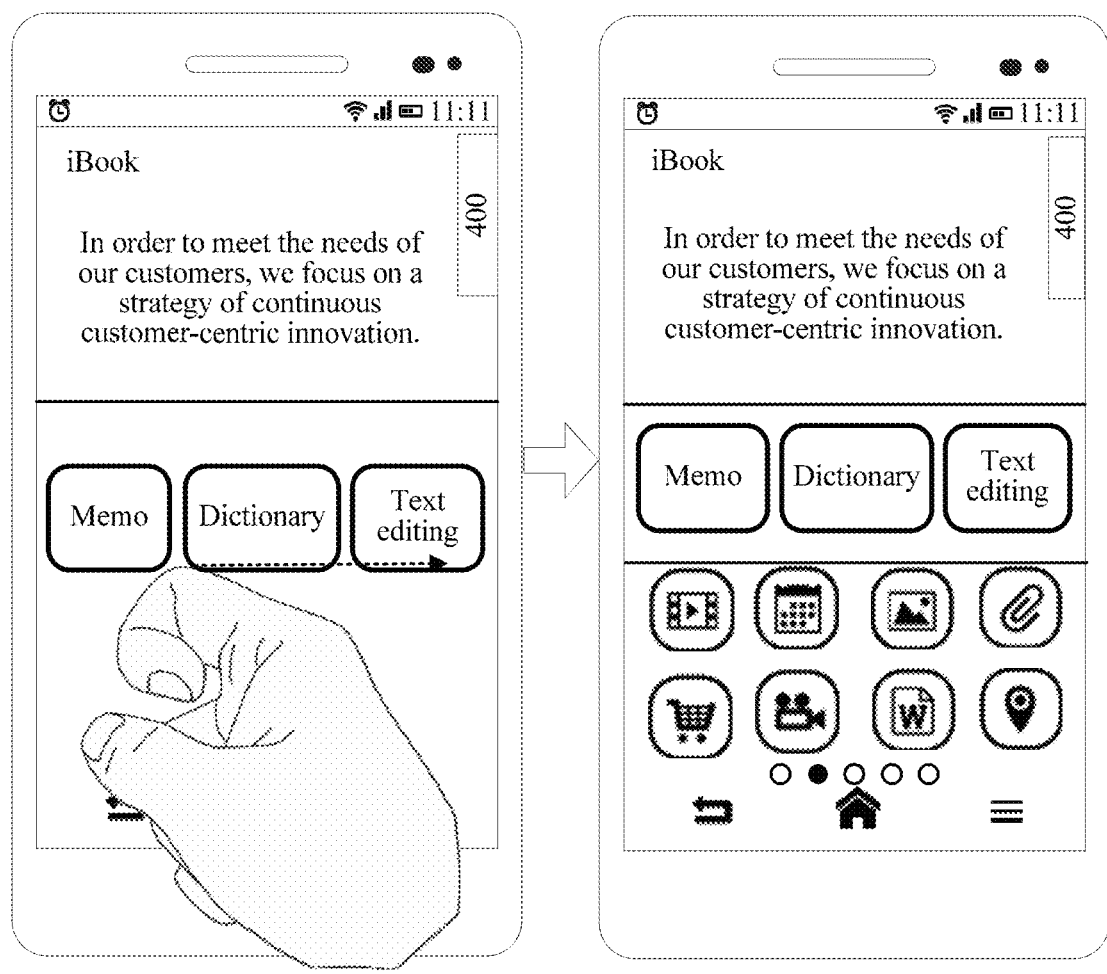
FIG. 10 is an example of a display UI for splitting a split screen UI into more display areas according to a touch gesture.

FIG. 10 is an example of a display UI for splitting a split screen UI into more display areas according to a touch gesture. As shown in FIG. 10, the split screen UI includes a first display area and a second display area. When it is detected that a knuckle touch gesture that matches a preset gesture acts on the second display area, the second display area is split, by using a track of the knuckle touch gesture as a boundary, into two display areas in response to the knuckle touch gesture. A display UI of the original second display area is displayed in a display area above the boundary, and it may be understood that a size of the display UI of the original second display area is reduced. A display area below the boundary is a third display area, and a main menu UI may be displayed.

This embodiment of the present invention further provides an electronic device for implementing quick screen splitting.

The electronic device includes a touch-sensitive display unit 130, a memory 120, an acceleration sensor 151, and a processor 190.

The touch-sensitive display unit 130 may be a display having a touch-sensitive surface, and the touch-sensitive display unit 130 includes the touch-sensitive surface and a display screen. The touch-sensitive display unit 130 is configured to present a display UI, and is further configured to receive touch information acting on the touch-sensitive surface, and transfer the touch information to the processor 190. The touch information may include touch point coordinates, a touch-sensitive surface grid capacitance, or one or more signals in a touch action, and the touch action may include an action such as pressing, moving, or lifting.

The memory 120 stores an instruction.

The acceleration sensor is configured to obtain a Z-axis direction acceleration signal and transfer the obtained Z-axis direction acceleration signal to the processor 190.

The processor 190 invokes the instruction stored in the memory 120 to implement a corresponding function in the foregoing method, for example, when a touch gesture acting on the touch-sensitive surface is detected, determining whether the touch gesture matches a preset gesture, and when it is determined that the touch gesture matches the preset gesture, splitting a display UI of a display into at least two display areas in response to the touch gesture, and/or a function corresponding to another method described in the present invention.

In some embodiments, the electronic device further includes a pressure sensor 196, and the pressure sensor 196 is configured to detect pressure applied on the electronic device and transfer a value of the detected pressure to the processor 190.

Based on a same inventive concept, a problem-resolving principle of the electronic device is similar to the screen splitting method in the method embodiment of the present invention. Therefore, for implementation of the electronic device, refer to implementation of the method, and no repeated description is provided.

This embodiment of the present invention further provides an apparatus for implementing quick screen splitting.

The apparatus includes a detection unit, a determining unit, and a screen splitting unit.

The detection unit is configured to detect a touch gesture acting on a touch-sensitive surface.

The determining unit is configured to determine whether the touch gesture matches a preset gesture.

The screen splitting unit is configured to split a display UI of a display into at least two display areas when the touch gesture matches the preset gesture.

Based on a same inventive concept, a problem-resolving principle of the apparatus is similar to the screen splitting method in the method embodiment of the present invention. Therefore, for implementation of the apparatus, refer to implementation of the method, and no repeated description is provided.

The technical solutions used in the quick screen splitting method, electronic device, and apparatus in this embodiment of the present invention disclose a method for splitting a display UI of a display into at least two display areas by using a touch gesture. In a process of using an electronic device with a touch-sensitive display unit by a user, when the user wants to perform a screen splitting operation, a screen splitting function can be triggered only by executing a preset touch gesture on the touch-sensitive display unit. Correspondingly, the electronic device may split a display UI of the electronic device into at least two display areas according to an identified touch gesture that matches a preset gesture. Compared with that in the prior art, in the present invention, the user can more conveniently implement the screen splitting function by using the touch gesture, and different display UIs can be separately presented in a provided split screen area. Therefore, according to the technical solution of the screen splitting operation provided in the present invention, the screen splitting operation can be conveniently and quickly performed. Operation steps of screen splitting are simplified, and user experience is improved.

It should be noted that in an actual application, the screen splitting solution may use any solution combination of the foregoing solutions, and this is not specifically limited in this embodiment of the present invention.

In the embodiments provided in this application, it may be understood by persons of ordinary skill in the art that all or some steps for implementing the foregoing embodiments are merely examples, and may be completed by using hardware, or may be completed by a program instructing relevant hardware, and when completed by a program instructing relevant hardware, the program may be stored in a non-volatile (non-transitory) computer readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A quick screen splitting method, comprises:
   detecting, by a portable electronic device, a knuckle touch gesture acting on a touch-sensitive surface of the portable electronic device, and
   splitting, by the portable electronic device, a display user interface (UI) into at least two display areas in response to the knuckle touch gesture;
   wherein the knuckle touch gesture includes a knuckle touch action that occurs when a touch-sensitive surface grid capacitance generated by the knuckle touch action acting on the touch-sensitive surface is within a first preset capacitance range, a quantity of non-zero capacitance grids is less than a preset value, and a Z-axis direction acceleration signal is within the first preset acceleration range.

2. The method according to claim 1, wherein the method further comprises:
   determining, by the portable electronic device, whether a movement distance of the knuckle touch gesture is greater than a preset distance threshold in response to detecting the knuckle touch gesture acting on the touch-sensitive surface.

3. The method according to claim 1, wherein the method further comprises:
   determining, by the portable electronic device, whether a track of the knuckle touch gesture matches a preset track in response to detecting the knuckle touch gesture acting on the touch-sensitive surface.

4. The method according to claim 1, the method further comprises:
   in response to detecting the knuckle touch gesture acting on the touch-sensitive surface, determining, by the portable electronic device, whether an included angle formed by a track of the knuckle touch gesture and a horizontal axis direction or a vertical axis direction is less than a preset angle.

5. The method according to claim 1, wherein the splitting a display UI into at least two display areas comprises:
splitting the display UI into the at least two display areas according to a preset boundary.

6. The method according to claim 1, wherein the splitting a display UI into at least two display areas comprises:
splitting the display UI into the at least two display areas according to a movement track of the knuckle touch gesture.

7. The method according to claim 1, wherein the splitting a display UI into at least two display areas comprises:
splitting the display UI into the at least two display areas according to a direction of the knuckle touch gesture and coordinates of a start location of the knuckle touch gesture.

8. The method according to claim 1, wherein the splitting a display UI into at least two display areas comprises:
when a running UI of a first application program is displayed on the display UI, reducing a size of the running UI of the first application program;
displaying, in a first display area, a reduced running UI of the first application program; generating, in a display area different from the first display area, at least one display area; and
displaying, in the generated display area, at least one of an identifier of one or more application programs related to the first application program, a running UI of an application program related to the first application program, a main menu UI, a historical program identifier, or a thumbnail of a running UI of a historical program.

9. The method according to claim 8, wherein in response to an operation instruction of moving an identifier displayed in the display area different from the first display area to the first display area is detected, at least one of a running UI of an application program corresponding to the identifier is displayed in the first display area, the identifier is displayed in the first display area, the identifier is embedded into the reduced running UI of the first application program, or the moved content is embedded into the reduced running UI of the first application program.

10. A portable electronic device for quick screen splitting, wherein the portable electronic device comprising a display, a memory, an acceleration sensor, and at least one processor;
the display has a touch-sensitive surface, the touch-sensitive surface is used to receive a touch gesture, and the display is further configured to display a UI;
the acceleration sensor is configured to obtain a Z-axis direction acceleration signal and transfer the obtained acceleration signal to the processor; and
the memory is coupled to the at least one processor and storing programming instructions for execution by the at least one processor, the programming instructions instruct the at least one processor to:
detect a knuckle touch gesture acting on the touch-sensitive surface, and split a display user interface (UI) into at least two display areas in response to the knuckle touch gesture; wherein the knuckle touch gesture includes a knuckle touch action that occurs when a touch-sensitive surface grid capacitance generated by a touch action performed on the touch-sensitive surface is within a first preset capacitance range, a quantity of non-zero capacitance grids is less than a preset value, and a Z-axis direction acceleration signal is within a first preset acceleration range.

11. The portable electronic device according to claim 10, wherein the programming instructions further instruct the at least one processor to: determining whether a movement distance of the knuckle touch gesture is greater than a preset distance threshold in response to detecting the knuckle touch gesture acting on the touch-sensitive surface.

12. The portable electronic device according to claim 10, wherein the programming instructions further instruct the at least one processor to: determining whether a track of the knuckle touch gesture matches a preset track in response to detecting the knuckle touch gesture acting on the touch-sensitive surface.

13. The portable electronic device according to claim 10, wherein the programming instructions further instruct the at least one processor to: determining whether an included angle formed by a track of the knuckle touch gesture and a horizontal axis direction or a vertical axis direction is less than a preset angle in response to detecting the knuckle touch gesture acting on the touch-sensitive surface.

14. The portable electronic device according to claim 10, wherein the splitting a display UI into at least two display areas comprises:
splitting the display UI into the at least two display areas according to a preset boundary.

15. The portable electronic device according to claim 10, wherein the splitting a display UI into at least two display areas comprises:
splitting the display UI into the at least two display areas according to a movement track of the knuckle touch gesture.

16. The portable electronic device according to claim 10, wherein the splitting a display UI into at least two display areas comprises:
splitting the display UI into the at least two display areas according to a direction of the knuckle touch gesture and coordinates of a start location of the knuckle touch gesture.

17. The portable electronic device according to claim 10, wherein the splitting a display UI into at least two display areas comprises:
when a running UI of a first application program is displayed on the display UI, reducing a size of the running UI of the first application program;
displaying, in a first display area, a reduced running UI of the first application program;
generating, in a display area different from the first display area, at least one display area; and
displaying, in the generated display area, at least one of an identifier of one or more application programs related to the first application program, a running UI of an application program related to the first application program, a main menu UI, a historical program identifier, or a thumbnail of a running UI of a historical program.

18. The portable electronic device according to claim 17, wherein in response to detecting an operation instruction of moving an identifier displayed in the display area different from the first display area to the first display area, at least one of a running UI of an application program corresponding to the identifier is displayed in the first display area, the identifier is displayed in the first display area, the identifier is embedded into the reduced running UI of the first application program, or the moved content is embedded into the reduced running UI of the first application program.

19. A non-transitory computer readable storage medium for storing one or more programs, wherein the one or more programs comprise an instruction, and when the instruction is executed by a portable electronic device that comprises a display having a touch-sensitive surface, the instruction enables the portable electronic device to execute the following operations:

detecting, by the portable electronic device, a knuckle touch gesture acting on the touch-sensitive surface of the portable electronic device, and splitting a display UI into at least two display areas in response to the knuckle touch gesture;

wherein the knuckle touch gesture includes a knuckle touch action that occurs when a touch-sensitive surface grid capacitance generated by a touch action acting on the touch-sensitive surface is within a first preset capacitance range, a quantity of non-zero capacitance grids is less than a preset value, and a Z-axis direction acceleration signal is within a first preset acceleration range.

20. The A non-transitory computer readable storage medium according to claim 19, wherein the instruction further enables the portable electronic device to execute the following operations:

determining whether a movement distance of the knuckle touch gesture is greater than a preset distance threshold after the knuckle touch gesture acting on the touch-sensitive surface is detected.

* * * * *

UNITED STATES PATENT AND TRADEMARK OFFICE
CERTIFICATE OF CORRECTION

PATENT NO. : 10,642,483 B2
APPLICATION NO. : 15/779039
DATED : May 5, 2020
INVENTOR(S) : Jin Wang and Jie Xu Page 1 of 1

It is certified that error appears in the above-identified patent and that said Letters Patent is hereby corrected as shown below:

In the Claims

In Column 25, Line 18, in Claim 20, delete "The A" and insert -- The --, therefor.

Signed and Sealed this
Fourteenth Day of July, 2020

Andrei Iancu
*Director of the United States Patent and Trademark Office*